(12) United States Patent
Daniel

(10) Patent No.: US 10,537,954 B2
(45) Date of Patent: Jan. 21, 2020

(54) SYSTEMS AND METHODS PROVIDING CONTACT TIP TO WORK DISTANCE (CTWD) FEEDBACK FOR AUGMENTED REALITY

(71) Applicant: LINCOLN GLOBAL, INC., City of Industry, CA (US)

(72) Inventor: Joseph A. Daniel, Sagamore Hills, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 356 days.

(21) Appl. No.: 14/073,389

(22) Filed: Nov. 6, 2013

(65) Prior Publication Data
US 2014/0312020 A1 Oct. 23, 2014

Related U.S. Application Data

(60) Provisional application No. 61/812,782, filed on Apr. 17, 2013.

(51) Int. Cl.
*B23K 9/073* (2006.01)
*B23K 9/12* (2006.01)
(Continued)

(52) U.S. Cl.
CPC ............ *B23K 9/0737* (2013.01); *B23K 9/095* (2013.01); *B23K 9/0953* (2013.01); *B23K 9/1006* (2013.01); *B23K 9/126* (2013.01)

(58) Field of Classification Search
CPC .... B23K 9/0737; B23K 9/095; B23K 9/1043; B23K 9/126; B23K 9/173; B23K 9/0953; B23K 9/1006; B23K 9/1012
(Continued)

(56) References Cited

U.S. PATENT DOCUMENTS 4,525,619 A    6/1985 Ide et al.
4,555,614 A    11/1985 Morris et al.
(Continued)

FOREIGN PATENT DOCUMENTS

CN    102014819    4/2011
GB    2454232    6/2009
JP    2004025270 A    1/2004

OTHER PUBLICATIONS

International Search Report and Written Opinion for PCT/IB2014/000579 dated Nov. 5, 2014.
(Continued)

*Primary Examiner* — Michael G Hoang
(74) *Attorney, Agent, or Firm* — Tucker Ellis LLP

(57) ABSTRACT

A system and method to make a welder aware of contact tip-to-work distance (CTWD) during a welding process. One or both of welding output current and wire feed speed is sampled in real time during the welding process. The actual CTWD is determined in real time based on at least one or both of the sampled welding output current and wire feed speed. The actual CTWD may be compared to a target CTWD in real time, where the target CTWD represents an estimated or desired CTWD for the welding process. A deviation parameter may be generated based on the comparing. An indication of the deviation parameter or the actual CTWD may be provided to a welder performing the welding process as feedback, allowing the welder to adjust the actual CTWD to better match the target CTWD in real time during the welding process.

16 Claims, 8 Drawing Sheets

(51) Int. Cl.
   *B23K 9/095* (2006.01)
   *B23K 9/10* (2006.01)

(58) Field of Classification Search
   USPC ... 219/124.02, 124.03, 124.1, 137.2, 130.01, 219/130.1, 137.31, 137
   See application file for complete search history.

(56) References Cited

U.S. PATENT DOCUMENTS

| | | | | |
|---|---|---|---|---|
| 4,650,957 A | * | 3/1987 | Cullen | B23K 9/0731 219/124.03 |
| 4,825,038 A | | 4/1989 | Smartt et al. | |
| 5,349,156 A | | 9/1994 | Madigan et al. | |
| 5,510,596 A | * | 4/1996 | Xu | B23K 31/006 219/124.34 |
| 6,184,491 B1 | | 2/2001 | Crane et al. | |
| 7,405,377 B2 | | 7/2008 | James et al. | |
| 8,316,462 B2 | | 11/2012 | Becker et al. | |
| 2006/0138115 A1 | * | 6/2006 | Norrish | B23K 9/09 219/137.71 |
| 2009/0071942 A1 | | 3/2009 | Kachline et al. | |
| 2009/0298024 A1 | * | 12/2009 | Batzler | B23K 9/32 434/234 |
| 2011/0248864 A1 | | 10/2011 | Becker et al. | |
| 2012/0055911 A1 | | 3/2012 | Jia et al. | |
| 2012/0074114 A1 | | 3/2012 | Kawamoto et al. | |
| 2012/0095941 A1 | * | 4/2012 | Dolson | B23K 9/0953 705/400 |
| 2012/0305536 A1 | | 12/2012 | Zhang et al. | |
| 2013/0168375 A1 | | 7/2013 | Aberg | |

OTHER PUBLICATIONS

PCT/IB2014/000579—International Search Report and Written Opinion of the International Searching Authority dated Oct. 29, 2015.
201480027306.4 First Office Action dated Aug. 3, 2016.
201480027306.4 2nd Office Action dated May 27, 2017.
Claims—1st. Office Action Response—Aug. 3, 2016.

* cited by examiner

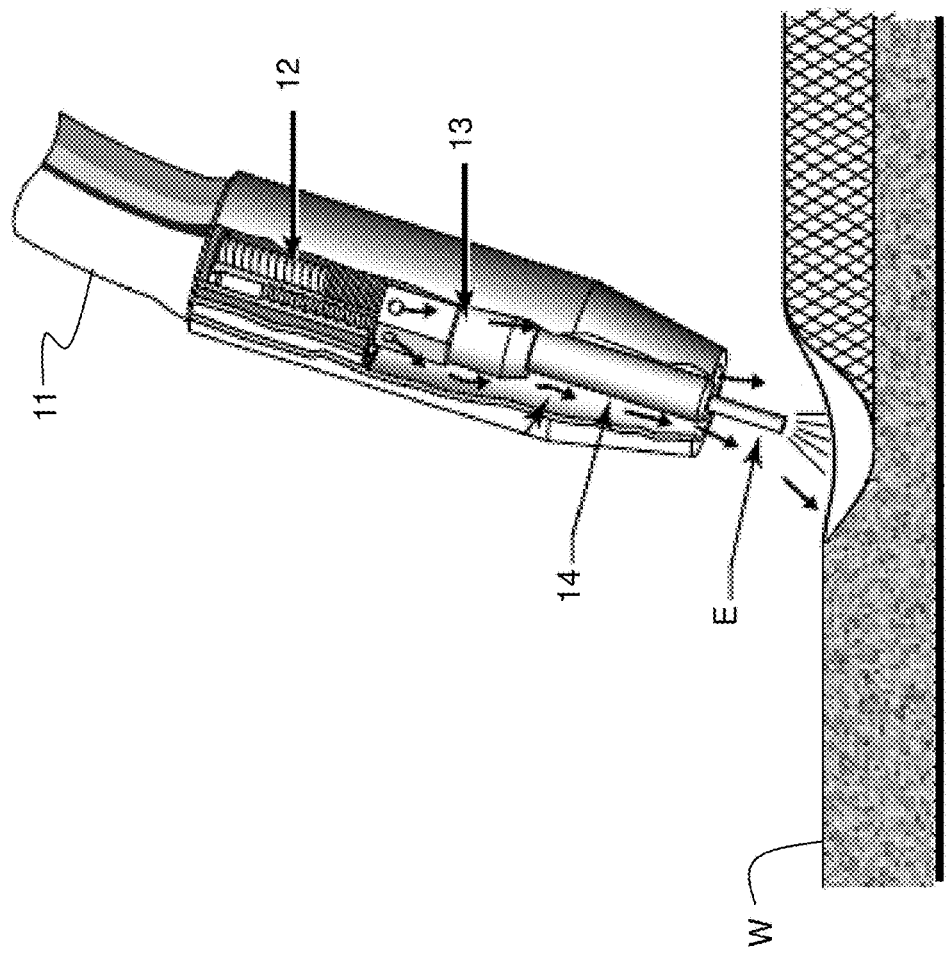

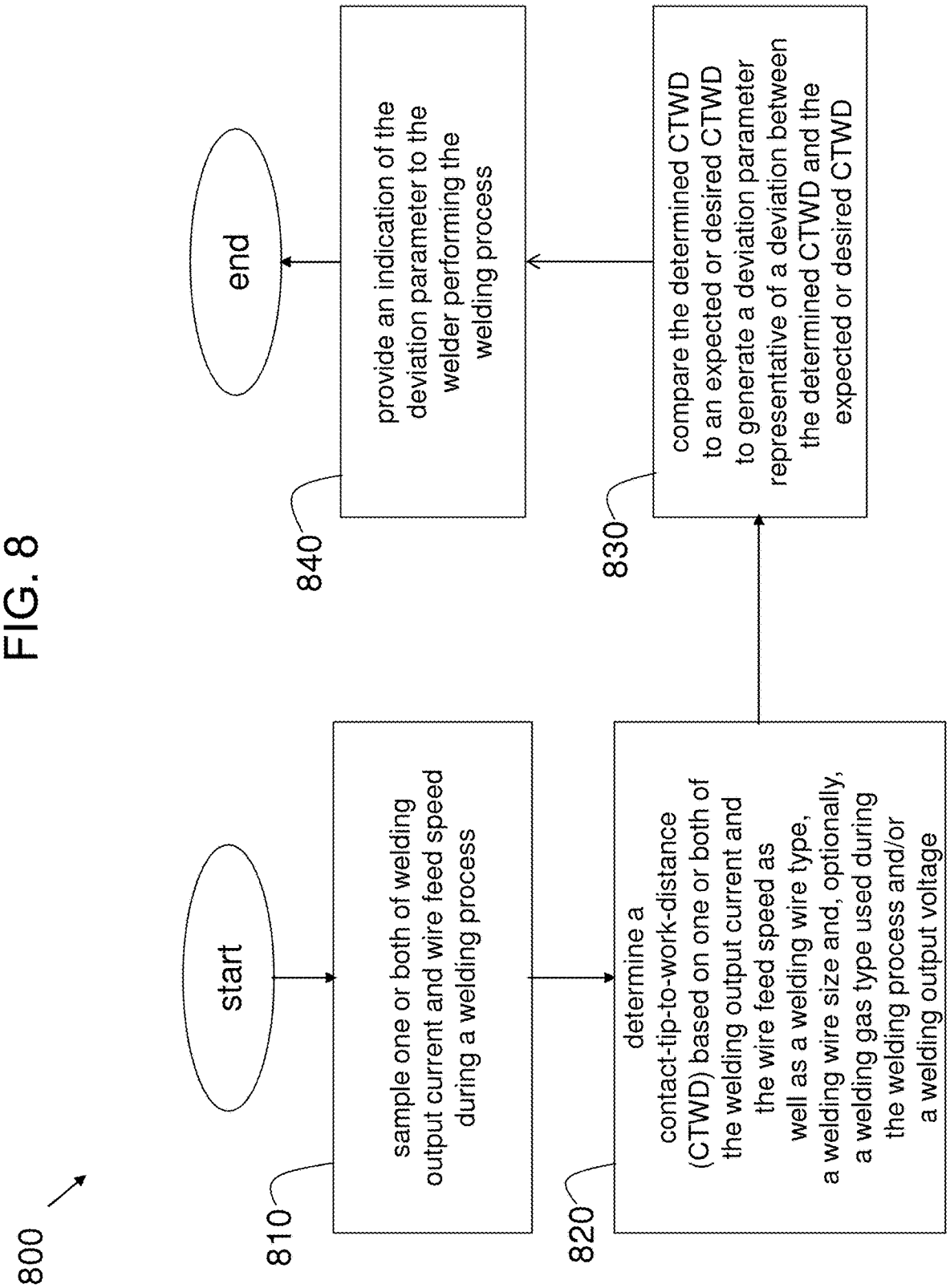

US 10,537,954 B2

SYSTEMS AND METHODS PROVIDING CONTACT TIP TO WORK DISTANCE (CTWD) FEEDBACK FOR AUGMENTED REALITY

This U.S. patent application claims priority to and the benefit of U.S. provisional patent application Ser. No. 61/812,782 filed on Apr. 17, 2013, which is incorporated herein by reference in its entirety.

TECHNICAL FIELD

Certain embodiments of the present invention relate to arc welding. More particularly, certain embodiments of the present invention relate to systems and methods providing contact tip to work distance (CTWD) feedback for augmented reality.

BACKGROUND

Keeping a consistent desired contact tip-to-work distance (CTWD) during a welding process is important. In general, as CTWD increases, the welding current decreases. A CTWD that is too long may cause the welding electrode to get too hot and may also waste shielding gas. Furthermore, the desired CTWD may be different for different welding processes. Today, welding processes rely on the welding operator to achieve a desired CTWD. As a result, the ability to consistently achieve a desired CTWD may be restricted and may require significant training and experience of the welder.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

In one embodiment, a method is provided that includes sampling one or more of a welding output current and a welding wire feed speed during an arc welding process using a welding power source, and determining an actual contact tip-to-work distance (CTWD) in real time based on at least one or more of the welding output current and the wire feed speed using the welding power source. The method may further include providing an indication of the actual CTWD to a welder performing the welding process by, for example, providing a visual indication, an audible indication, or a tactile indication. The method may include comparing the actual CTWD to a target CTWD in real time, and generating a deviation parameter in real time representative of a present deviation of the actual CTWD from the target CTWD based on the comparing. The method may further include providing an indication of the deviation parameter to a welder performing the welding process by, for example, providing a visual indication, an audible indication, or a tactile indication. The actual CTWD may be further based on one or more of a welding wire type, a welding wire size, a welding output voltage, and a shielding gas type using during the welding process.

In one embodiment, a system is provided that includes a welding power source. The welding power source is configured to sample one or more of a welding output current and a wire feed speed in real time during a welding process, and determine an actual CTWD in real time based on at least one or more of the welding output current and the wire feed speed. The system further includes means for providing an indication of the actual CTWD to a welder performing the welding process, where the indication may include one or more of a visual indication, an audible indication, and a tactile indication. The welding power source may be configured to compare the actual CTWD to a target CTWD in real time, and generate a deviation parameter in real time representative of a present deviation of the actual CTWD from the target CTWD based on the comparing. Means for providing an indication of the deviation parameter to a welder performing the welding process may be provided, where the indication may include one or more of a visual indication, an audible indication, and a tactile indication. The welding power source may further be configured to determine the actual CTWD based on one or more of a welding wire type, a welding wire size, a welding output voltage, and a shielding gas type using during the welding process.

In one embodiment, a welding power source is provided having a controller. The controller is configured to determine an actual CTWD in real time based on at least one or more of a welding output current and a wire feed speed during a welding process. The controller may further be configured to determine the actual CTWD based also on one or more of a welding wire type, a welding wire size, a welding output voltage, and a shielding gas type used during the welding process. The controller may further be configured to compare the actual CTWD to a target CTWD in real time, and generate a deviation parameter in real time representative of a present deviation of the actual CTWD from the target CTWD based on the comparing. The welding power source may also include a current feedback circuit operatively connected to the controller and configured to sample and feed back the welding output current to the controller. The welding power source may also include a voltage feedback circuit operatively connected to the controller and configured to sample and feed back the welding output voltage to the controller.

Details of illustrated embodiments of the present invention will be more fully understood from the following description and drawings.

BRIEF DESCRIPTION OF THE DRAWINGS

FIG. 3 illustrates a diagram of an exemplary embodiment of a portion of the welding gun of the arc welding system of FIG. 1 interacting with a workpiece during an arc welding process;

FIG. 8 illustrates a flowchart of an exemplary embodiment of a method to alert a welder during a welding process if the actual CTWD is deviating from the desired CTWD.

DETAILED DESCRIPTION

Figure 1:
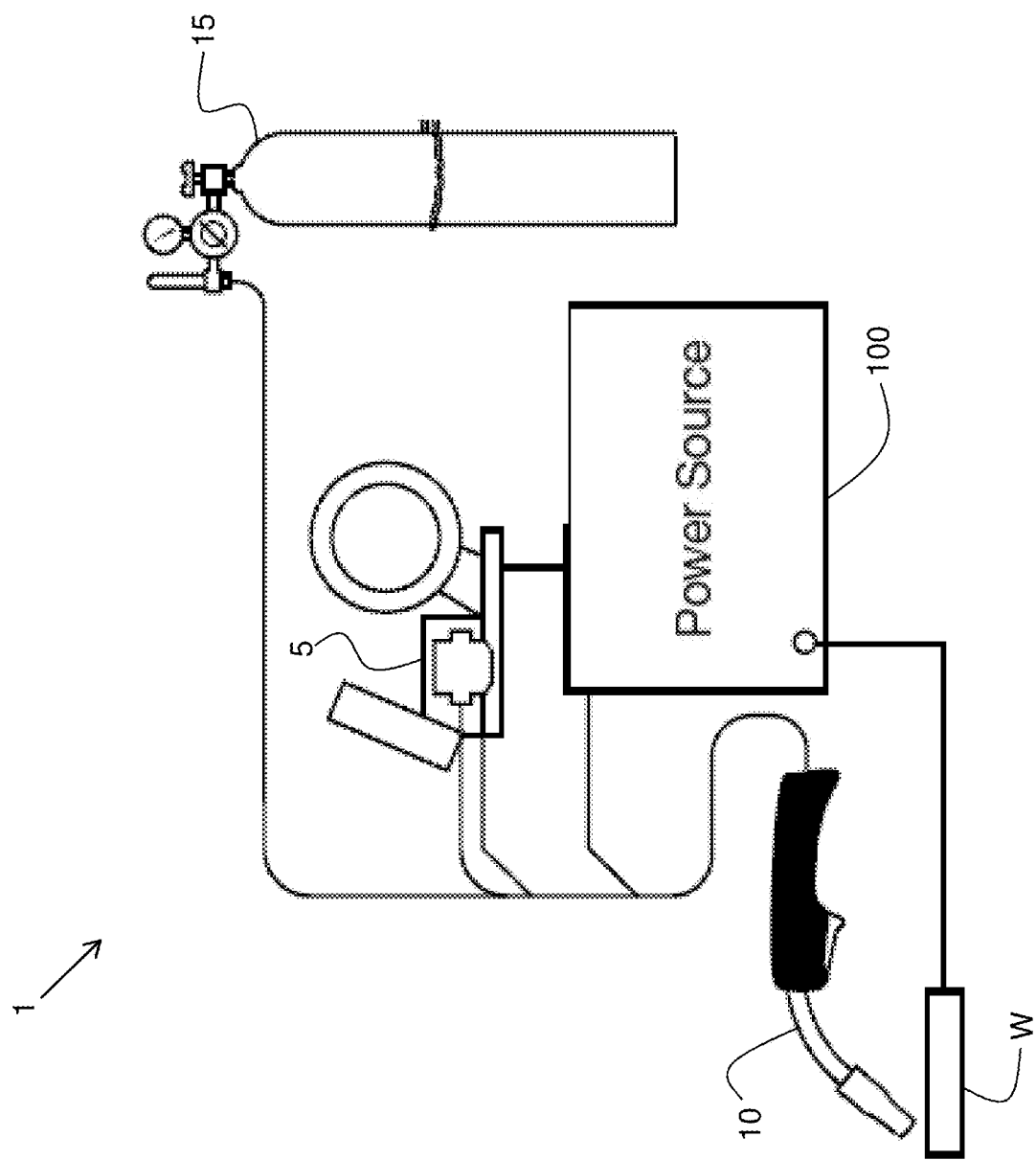
FIG. 1 illustrates a diagram of an exemplary embodiment of an arc welding system.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable welding wire for the purpose of applying electrical power to the consumable welding wire provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

The term "welding parameter" is used broadly herein and may refer to characteristics of a portion of a welding output current waveform (e.g., amplitude, pulse width or duration, slope, electrode polarity), a welding process (e.g., a short arc welding process or a pulse welding process), wire feed speed, a modulation frequency, or a welding travel speed.

FIG. 1 illustrates a diagram of an exemplary embodiment of an arc welding system 1. The arc welding system 1 includes a wire feeder 5, a welding gun 10, a shielding gas supply 15, and a power source 100. The wire feeder 5, the welding gun 10, the shielding gas supply 15, and the power source 100 are operatively connected to allow a welder to create an electric arc between a welding wire and a workpiece W to create a weld as is well known in the art. In accordance with an embodiment, shielding gases may be used during a gas metal arc welding (GMAW) process to protect the welding region from atmospheric gases such as oxygen or nitrogen, for example. Such atmospheric gases may cause various weld metal defects such as, for example, fusion defects, embrittlement, and porosity.

The type of shielding gas, or combination of shielding gases used depend on the material being welded and the welding process. The rate of flow of the shielding gas to be provided depends on the type of shielding gas, the travel speed, the welding current, the weld geometry, and the metal transfer mode of the welding process. Inert shielding gases include argon and helium. However, there may be situations when it is desirable to use other shielding gases or combinations of gases such as, for example, carbon dioxide ($CO_2$) and oxygen. In accordance with an embodiment, a shielding gas may be fed to a welding tool during an arc welding process such that the welding tool disperses the shielding gas to the weld region during the welding process.

Selection of a welding wire or electrode is dependent on the composition of the workpiece being welded, the welding process, the configuration of the weld joint, and the surface conditions of the welding workpiece. Welding wire selection may largely affect the mechanical properties of the resultant weld and may be a main determinant of weld quality. It may be desirable for the resultant weld metal to have mechanical properties like those of the base material, without defects such as discontinuities, contaminants, or porosity.

Existing welding wire electrodes often contain deoxidizing metals such as silicon, manganese, titanium, and aluminum in relatively small percentages to help prevent oxygen porosity. Some electrodes may contain metals such as titanium and zirconium to avoid nitrogen porosity. Depending on the welding process and base material being welded, the diameters of the electrodes used in gas metal arc welding (GMAW) typically range from 0.028-0.095 inches, but may be as large as 0.16 inches. The smallest electrodes, generally up to 0.045 inches in diameter, may be associated with a short-circuit metal transfer process, while electrodes used for spray-transfer processes may be at least 0.035 inches in diameter.

Figure 2:
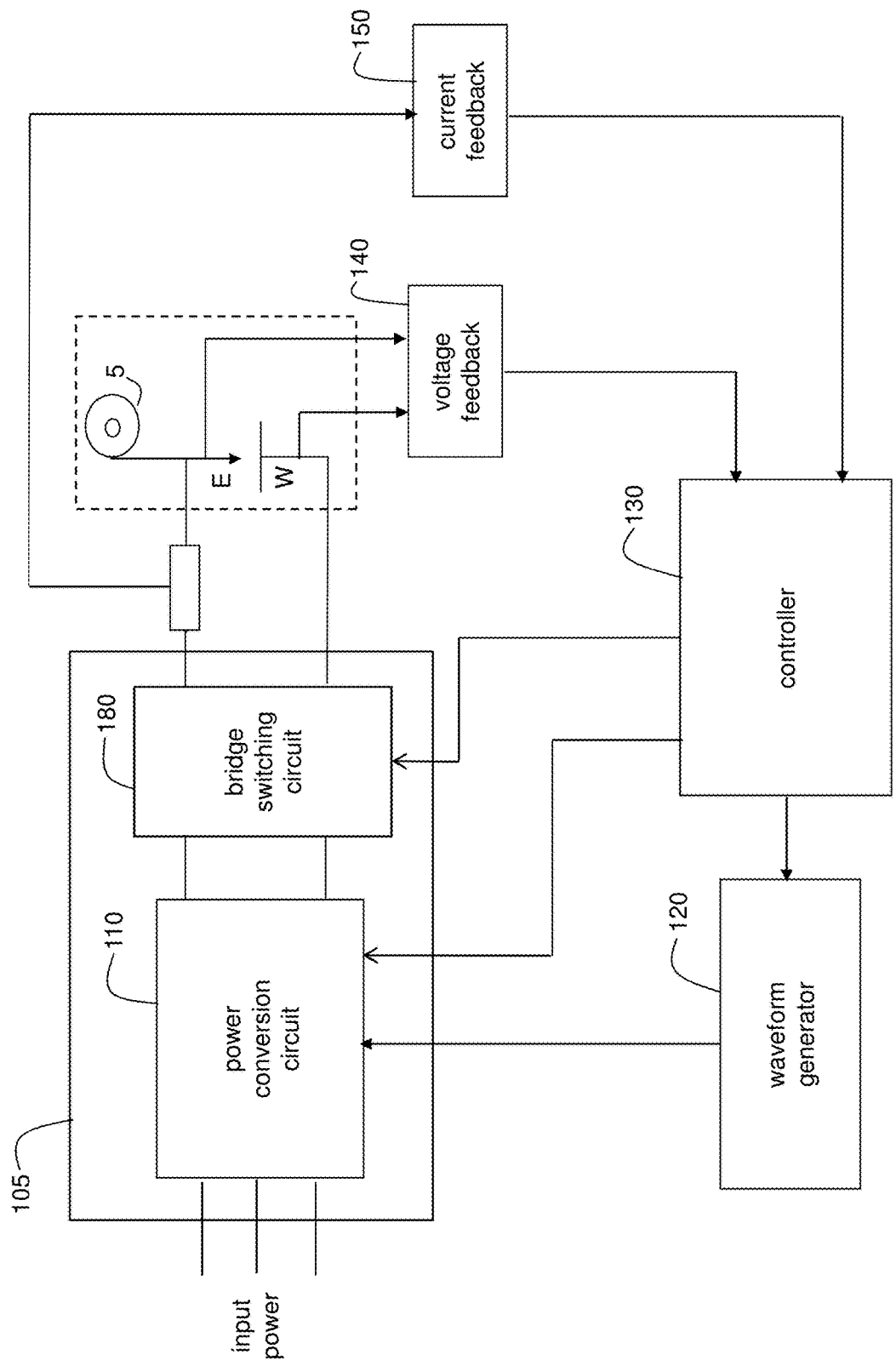
FIG. 2 illustrates a schematic block diagram of an exemplary embodiment of the power source of the arc welding system of FIG. 1 operatively connected to a consumable welding electrode and a workpiece.

FIG. 2 illustrates a schematic block diagram of an exemplary embodiment of the power source 100 of the arc welding system 1 of FIG. 1 operatively connected to a consumable welding electrode E and a workpiece W. The power source 100 includes a switching power supply 105 having a power conversion circuit 110 and a bridge switching circuit 180 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The power source 100 also includes a bridge switching circuit 180 that is operatively connected to the power conversion circuit 110 and is configured to switch a direction of the polarity of the welding output current (e.g., for AC welding).

The power source 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W. The controller 130 also commands the switching of the bridge switching circuit 180 and may provide control commands to the power conversion circuit 110.

The power source 100 further includes a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect operation of the power source 100, for example. In accordance with an embodiment, the controller 130 is used to determine an actual CTWD during a welding process in real time, and compare the actual CTWD to an expected or desired CTWD, as is discussed in more detail later herein.

In accordance with an embodiment, the switching power supply 105, the waveform generator 120, the controller 130, the voltage feedback circuit 140, and the current feedback circuit 150 constitute the welding power source 100. The system 1 also includes a wire feeder 5 that feeds the consumable wire welding electrode E toward the workpiece W through the welding gun (welding tool) 10 at a selected wire feed speed (WFS). The wire feeder 5, the consumable welding electrode E, and the workpiece W are not part of the welding power source but may be operatively connected to the welding power source 100 via a welding output cable.

FIG. 3 illustrates a diagram of an exemplary embodiment of a portion of the welding gun 10 of the arc welding system 1 of FIG. 1 providing a welding wire electrode E that interacts with a workpiece W during an arc welding process. The welding gun 10 may have an insulated conductor tube 11, an electrode conduit 12, a gas diffuser 13, a contact tip 14, and a wire electrode E feeding through the gun 10. A control switch, or trigger, (not shown) when activated by the welder, starts the wire feed, electric power, and the shielding gas flow, causing an electric arc to be established between the electrode E and the workpiece W. The contact tip 14 is electrically conductive and is connected to the welding power source 100 through a welding cable and transmits electrical energy to the electrode E while directing the electrode E toward the workpiece W. The contact tip 14 is secured and sized to allow the electrode E to pass while maintaining electrical contact.

The wire feeder 5 supplies the electrode E to the workpiece W, driving the electrode E through the conduit 12 and on to the contact tip 14. The wire electrode E may be fed at a constant feed rate, or the feed rate may be varied based on the arc length and the welding voltage. Some wire feeders can reach feed rates as high as 1200 in/min, however, feed rates for semiautomatic GMAW typically range from 75-400 in/min.

On the way to the contact tip 14, the wire electrode E is protected and guided by the electrode conduit 12, which helps prevent kinking and maintains an uninterrupted feeding of the wire electrode E. The gas diffuser 13 directs the shielding gas evenly into the welding zone. A gas hose from the tank(s) of shielding gas supplies the gas to the gas diffuser 13.

Figure 4B:
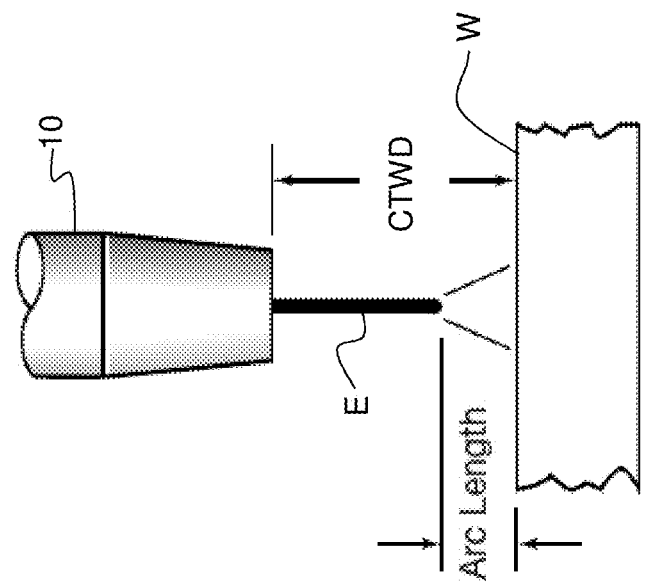
FIGS. 4A and 4B illustrate the concept of contact tip-to-work distance (CTWD) with and without the presence of an arc.
Figure 4A:
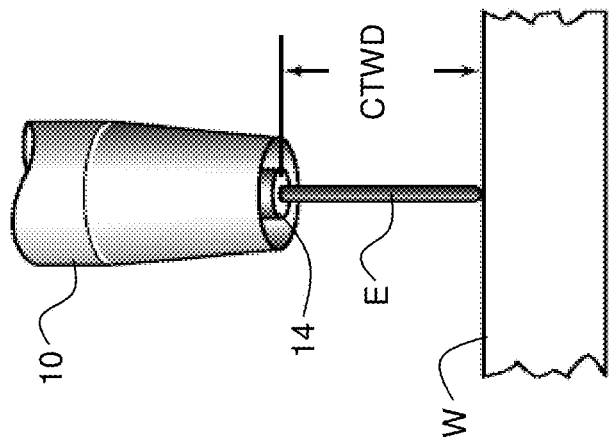

FIGS. 4A and 4B illustrate the concept of contact tip-to-work distance (CTWD) with and without the presence of an arc. In FIG. 4A, the CTWD is shown as the distance between the end of the contact tip 14 and the workpiece W with no arc established between the electrode E and the workpiece W. In FIG. 4B, the CTWD is shown as the distance between the end of the contact tip 14 and the workpiece W with an arc established between the electrode E and the workpiece W. Again, keeping a consistent, desired contact tip-to-work distance (CTWD) during a welding process is important. In general, as CTWD increases, the welding current decreases. A CTWD that is too long may cause the welding electrode to get too hot and may also waste shielding gas. Furthermore, the desired CTWD may be different for different welding processes.

Figure 5:
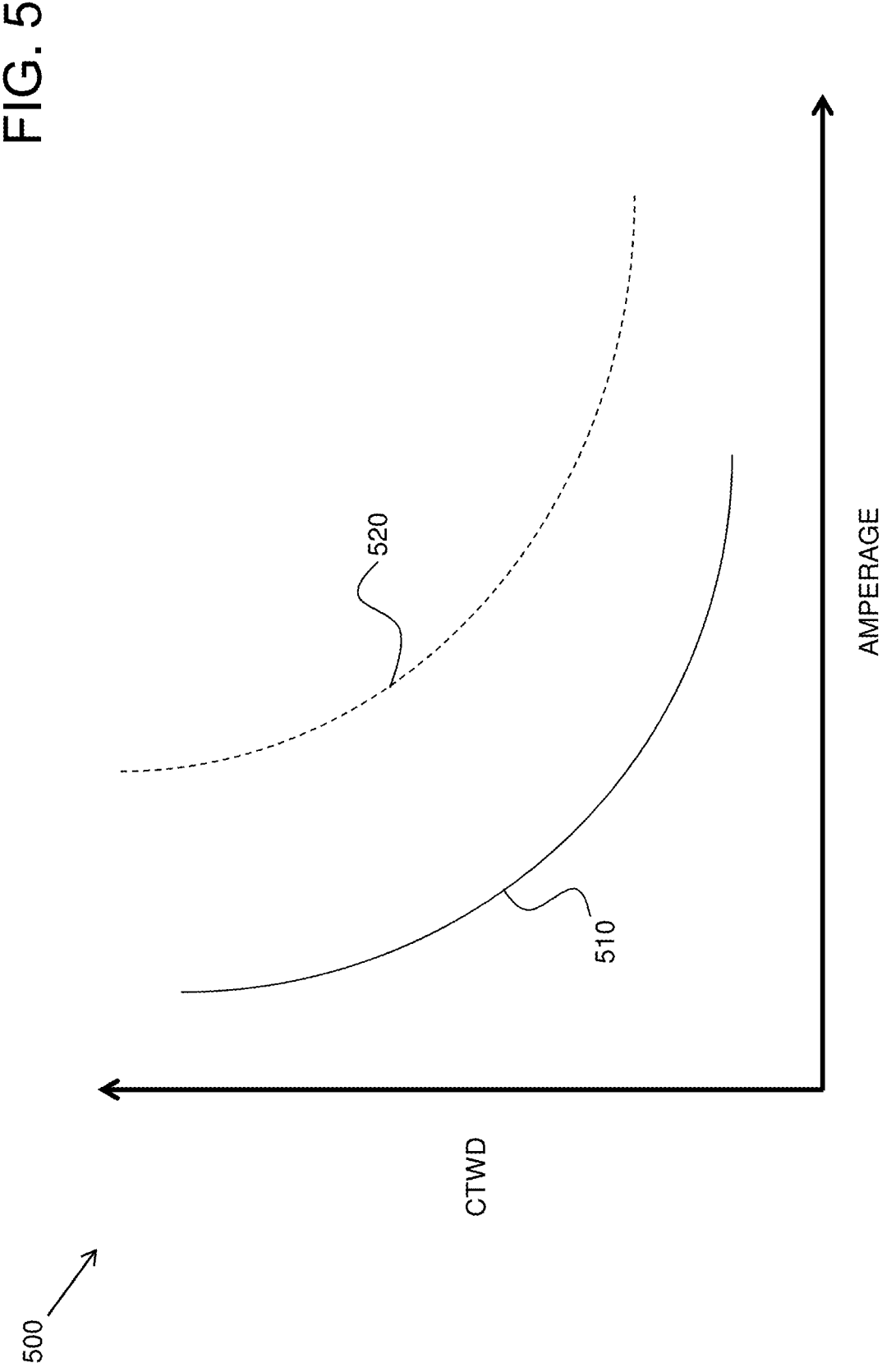
FIG. 5 illustrates an exemplary embodiment of a two-dimensional graph having two plots showing the relationship between CTWD and welding output current (amperage) for two different welding wires, being of the same type but of two different sizes, for an arc welding process at a given wire feed speed when a particular type of welding gas is used.

FIG. 5 illustrates an exemplary embodiment of a two-dimensional graph 500 having two plots 510 and 520 showing the relationship between CTWD and welding output current (amperage) for two different welding wires, being of the same type and fed at the same fixed rate, but being of two different diameters, for an arc welding process when a particular type of welding gas is used. In accordance with an embodiment, the actual CTWD during a welding process may be determined in real time by the controller 130 based on the welding output current (amperage), the welding electrode type, the welding electrode diameter, the wire feed speed (WFS), and the shielding gas used. As the CTWD changes in real time during a welding process, the welding output current (amperage) will reflect that change in real time, as defined by the appropriate plot (e.g., 510 or 520). As the actual CTWD changes in real time during the welding process, the controller, receiving the welding output current value fed back from the current feedback circuit 150, and already knowing the selected wire electrode type/diameter, shielding gas mixture, and wire feed speed, determines the actual CTWD.

In accordance with an embodiment plot 510 corresponds to a welding wire electrode, having a diameter of 0.045 inches and being of a mild steel, copper coated type, used in a welding process providing a mixture of 90% argon shielding gas and 10% carbon dioxide shielding gas. Furthermore, in accordance with an embodiment plot 520 corresponds to a welding wire electrode, having a diameter of 0.052 inches and being of a same mild steel, copper coated type, used in a welding process providing a same mixture of 90% argon shielding gas and 10% carbon dioxide shielding gas. As can be seen from FIG. 5, as the diameter of the welding wire of the same type is changed to an increased diameter, the plot representing the relationship of CTWD vs. amperage moves outward from the origin of the graph 500.

In accordance with various embodiments, the relationship between CTWD and amperage for a combination of welding electrode type, welding electrode diameter, wire feed speed, and shielding gas used may be determined experimentally or through analysis based on theory. Once such a relationship is determined, the relationship may be expressed or stored in the controller 130 as a look-up-table (LUT) or as a mathematical transfer function, for example.

Figure 6:
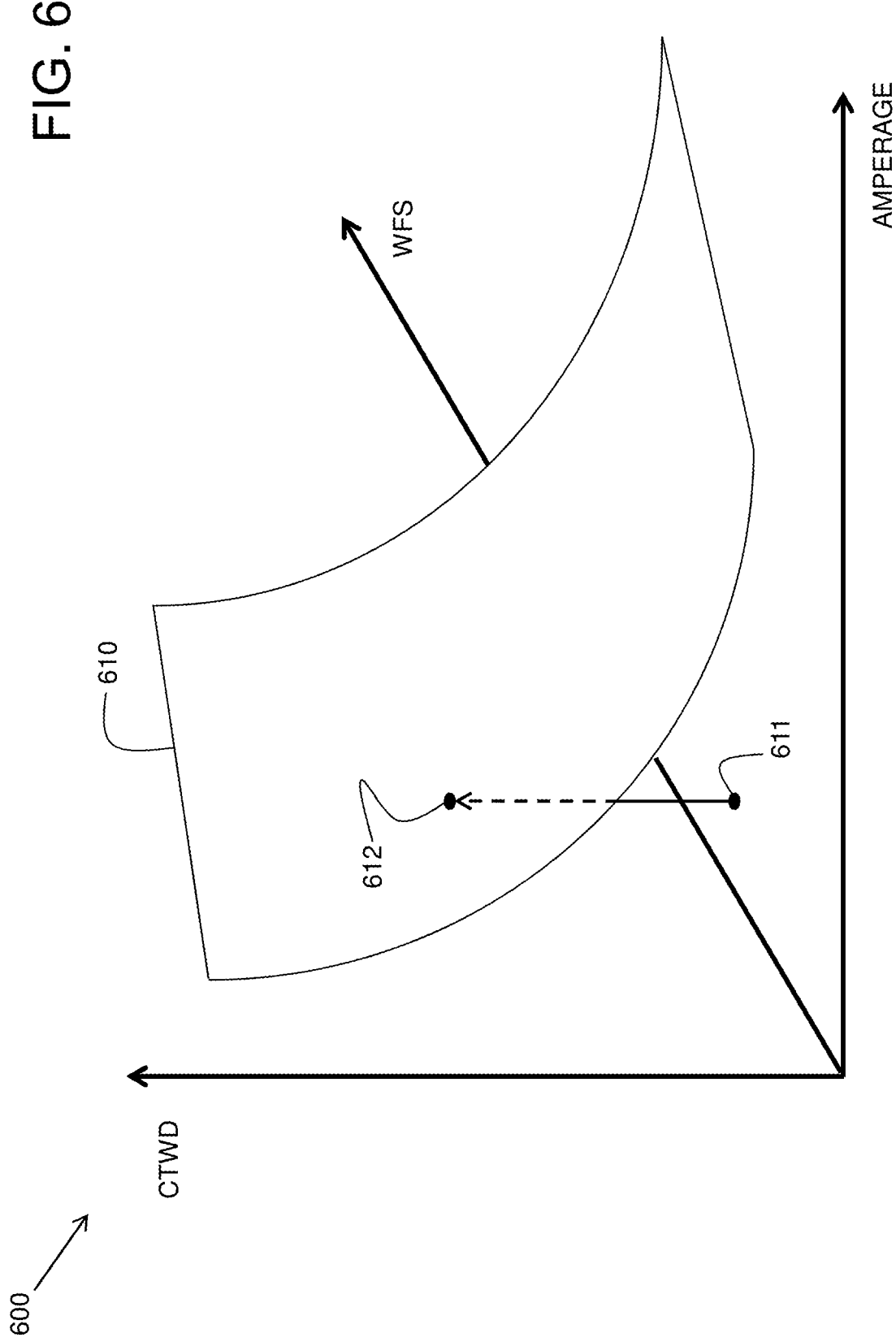
FIG. 6 illustrates an exemplary embodiment of a three-dimensional graph showing the relationship between CTWD, welding output current (amperage), and wire feed speed, being of a particular type and size, for an arc welding process when a particular type of welding gas is provided.

In accordance with an alternative embodiment, the wire feed speed (WFS) may vary during the welding process (e.g., based on the arc length and the welding voltage) and, therefore, the LUT or mathematical transfer function may reflect the effect of a changing wire feed speed on CTWD. For example, FIG. 6 illustrates an exemplary embodiment of a three-dimensional graph 600 showing the relationship between CTWD, welding output current (amperage), and wire feed speed (WFS) for a welding wire, being of a particular type and size, for an arc welding process when a particular type of welding gas is provided. The plot 610 on the graph 600 forms a surface. In accordance with an embodiment, the actual CTWD during a welding process may be determined in real time by the controller 130 based on the welding output current (amperage), the wire feed speed, the welding electrode type, the welding electrode diameter, and the shielding gas used.

As the actual CTWD changes in real time during a welding process, the paired welding output current (amperage) and WFS will reflect that change in real time, as defined by the surface plot 610 of the graph 600. Furthermore, as the actual CTWD changes in real time during the welding process, the controller 130, receiving the welding output current (amperage) value fed back from the current feedback circuit 150 and the WFS value fed back from the wire feeder 5, and already knowing the selected wire electrode type/diameter and shielding gas mixture, determines the actual CTWD. FIG. 6 shows an example of an amperage/WFS pair 611 corresponding to an actual CTWD value 612 as determined by the surface plot 610 of the graph 600. For other combinations of welding electrode type, welding electrode diameter, and shielding gas used, plots of other surfaces will define the relationship of CTWD, WFS, and amperage. In accordance with an alternative embodiment, taking into consideration the welding output voltage as fed back to the controller 130 from the voltage feedback circuit 140 may provide a more accurate determination of actual CTWD.

In accordance with various embodiments, the relationship between CTWD, WFS, and amperage for a combination of welding electrode type, welding electrode diameter, and shielding gas used may be determined experimentally or through analysis based on theory. Once such a relationship is determined, the relationship may be expressed or stored in the controller 130 as a look-up-table (LUT) or as a mathematical transfer function, for example.

Figure 7:
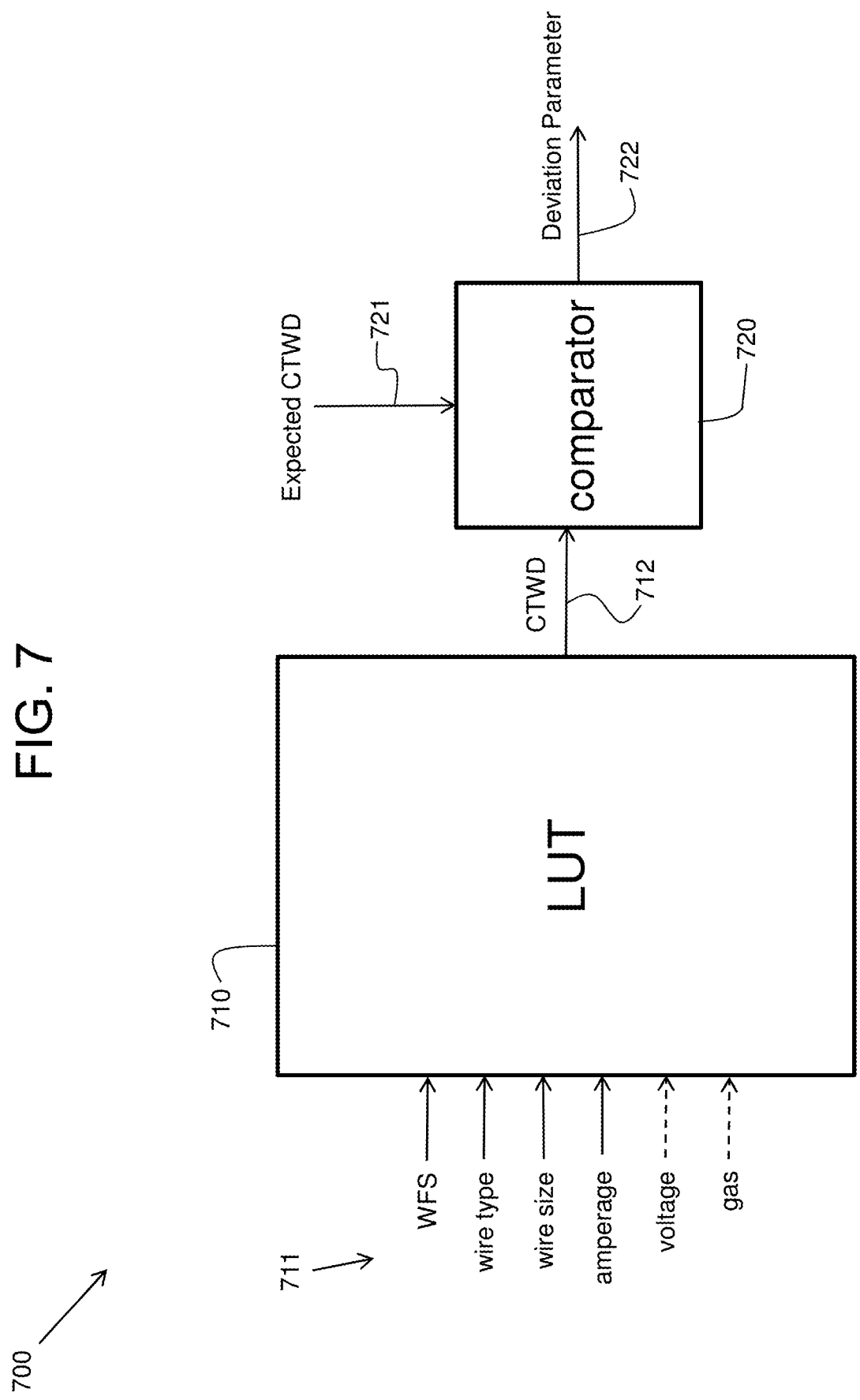
FIG. 7 illustrates an exemplary embodiment of a portion of the controller of the power source of FIG. 2 configured to determine a deviation parameter representative of a deviation between the actual CTWD during an arc welding process and a target (expected or desired) CTWD.

FIG. 7 illustrates an exemplary embodiment of a portion 700 of the controller 130 of the power source 100 of FIG. 2 configured to determine an actual CTWD and a deviation parameter representative of a deviation between the actual CTWD during an arc welding process and a target (expected or desired) CTWD. As shown in the embodiment of FIG. 7, a LUT 710 is used to implement the relationship between the inputs 711 (WFS, wire type, wire size, amperage, voltage, and shielding gas) and the output 712 (actual CTWD). The LUT 710 may be implemented in firmware, for example, as an EEPROM. In some embodiments, the inputs of welding output voltage or shielding gas may not be used.

For any particular combination of inputs 711, an output 712 representing actual CTWD, in real time, is produced. The actual CTWD 712 may be input to a comparator circuit 720 along with the target (expected or desired) CTWD 721. The comparator circuit 720 outputs a deviation parameter 722 based on the inputs to the comparator (712 and 721). The deviation parameter 722 may be a simple linear difference between the actual CTWD and the desired CTWD, or may be a more complex quantity representative of the deviation of the actual CTWD from the desired CTWD (e.g., a weighted quantity or a non-linear quantity).

FIG. 8 illustrates a flowchart of an exemplary embodiment of a method 800 to alert a welder during a welding process if the actual CTWD is deviating from the desired CTWD. In step 810, one or both of a welding output current and a wire feed speed is sampled or monitored in real time during a welding process. In step 820, actual CTWD is determined based on one or both of the welding output current and the wire feed speed as well as a welding wire type, a welding wire size and, optionally, a welding gas type used during the welding process and/or a welding output voltage. In step 830, the determined actual CTWD is compared to a target (expected or desired) CTWD and a deviation parameter is generated that is representative of a deviation between the determined actual CTWD and the target CTWD. In step 840, an indication of the deviation parameter is provided to the welder performing the welding process. The method 800 occurs continuously in real time during the welding process such that the welder is continuously made aware of the relation of actual CTWD to target CTWD.

The step 840 of providing an indication of the deviation parameter may be accomplished in a variety of ways. For example, in accordance with one embodiment, the welding gun 10 may be configured to provide tactile feedback in the form of a vibration at a first frequency when the actual CTWD is too long compared to the desired CTWD, and at a second frequency when the actual CTWD is too short compared to the desired CTWD. Furthermore, the intensity of the vibration may increase with an increase in the deviation. When the actual CTWD matches the desired CTWD, or is at least within a defined range of the desired CTWD, the gun 10 may not vibrate at all, indicating to the welder that the CTWD is within an acceptable range. The vibrations may be provided by one or more electrically activated vibrational components incorporated within or onto the welding gun 10, in accordance with an embodiment.

In accordance with another embodiment, the step 840 of providing an indication of the deviation parameter may be accomplished by providing audible feedback to the welder. For example, the power source 100 or a welding helmet worn by the welder (not shown) may be configured with a speaker device to provide audible feedback in the form of an audible sound. A lower frequency may be provided when the actual CTWD is too long compared to the desired CTWD, and a higher frequency may be provided when the actual CTWD is too short compared to the desired CTWD. Furthermore, the frequency of the sound may change as the amount of the deviation changes (gets smaller or larger). When the actual CTWD matches the desired CTWD, or is at least within a defined range of the desired CTWD, the audible sound may not occur at all, indicating to the welder that the CTWD is within an acceptable range. In embodiments where a speaker device is configured within a welding helmet, the speaker device may interface with the power source 100 via wired means or wireless means.

In accordance with a further embodiment, the step 840 of providing an indication of the deviation parameter may be accomplished by providing visual feedback to the welder. For example, a welding helmet worn by the welder (not shown) may be configured with a light-emitting source such as, for example, a light emitting diode (LED) device having several light emitting diodes (e.g., a red LED, a yellow LED, and a green LED). The green LED may be lit when the actual CTWD is within an acceptable range of the desired CTWD as represented by the deviation parameter 722. The yellow LED may be lit when the actual CTWD first begins to deviate outside the acceptable range as represented by the deviation parameter 722. The red LED may be lit when the actual CTWD is more than a determined amount outside of the acceptable range as represented by the deviation parameter 722. The LEDs may be positioned within the helmet such that the welder can clearly see the various emitted LED colors, if not the actual LEDs themselves. The LED device may interface with the power source 100 via wired means or wireless means, in accordance with various embodiments. In accordance with other embodiments, the LEDs may be positioned away from the welding helmet (e.g., on the welding gun 10).

Another form of visual feedback may include providing a graphical overlay on a viewing window within a welding helmet worn by a welder. For example, the welding helmet may be configured to project a graphical overlay onto a viewing window within the welding helmet, where the graphical overlay provides a target symbol and a deviation symbol. In accordance with an embodiment, the target symbol (e.g., a small circle) represents the desired CTWD. The deviation symbol (e.g., a vertical line) may move to one side or the other of the target symbol in the horizontal direction when the actual CTWD deviates from the desired CTWD as represented by the deviation parameter 722. The projection/viewing window configuration may interface with the power source 100 via wired means or wireless means, in accordance with various embodiments.

In accordance with another embodiment, the deviation parameter 722 may not be generated or used. Instead, an indication of the actual CTWD 712 may be directly indicated to the welder. For example, a numerical value of the actual CTWD 712 may be displayed to the welder within a welding helmet worn by the welder. The numerical value may be communicated to the welding helmet via wired means or wireless means, in accordance with various embodiments. Other various ways of providing the actual CTWD to the welder may be possible as well, in accordance with other embodiments.

In summary, a system and method to make a welder aware of contact tip-to-work distance (CTWD) during a welding process are provided. One or both of welding output current and wire feed speed is sampled in real time during the welding process. The actual CTWD is determined in real time based on at least one or both of the sampled welding output current and wire feed speed. The actual CTWD may be compared to a target CTWD in real time, where the target CTWD represents an estimated or desired CTWD for the welding process. A deviation parameter may be generated based on the comparing which is representative of a present deviation of the determined actual CTWD from the target CTWD. An indication of the deviation parameter or the actual CTWD may be provided to a welder performing the welding process as feedback, allowing the welder to adjust the actual CTWD to better match the target CTWD in real time during the welding process.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method, comprising:
storing a plurality of relationships between contact tip-to-work distance (CTWD) and one or more of a welding output current and a wire feed speed, wherein each individual relationship corresponds to a different combination of wire type, wire size, and shielding gas type;
selecting a relationship from the plurality of relationships between contact tip-to-work distance (CTWD) and one or more of a welding output current and a wire feed speed, wherein the relationship is selected based on a correspondence to a wire type and a wire size of a welding wire used during a welding process and a shielding gas type used during the welding process;
sampling, by a welding power source, one or more of the welding output current and the wire feed speed in real time during the welding process; and
determining, by the welding power source, an actual CTWD in real time from the relationship selected based on at least one of the welding output current or wire feed speed.

2. The method of claim 1, further comprising providing a tactile indication of the actual CTWD to a welder performing the welding process by vibration of a welding gun.

3. The method of claim 1, further comprising:
comparing the actual CTWD to a target CTWD in real time;
generating a deviation parameter in real time representative of a present deviation of the actual CTWD from the target CTWD based on the comparing; and
providing a tactile indication of the deviation parameter to a welder performing the welding process by adjusting a vibration frequency of a welding gun.

4. The method of claim 3, further comprising adjusting a vibration intensity of the welding gun based on the deviation parameter.

5. The method of claim 1, wherein the actual CTWD is further determined from a welding output voltage.

6. The method of claim 1, wherein determining the CTWD comprises utilizing at least one of a look-up table or a transfer function that relates the at least one of the welding output current or wire feed speed to the actual CTWD for the wire type and the wire size of the welding wire used during the welding process and the shielding gas type used during the welding process.

7. A welding system, comprising a welding power source, wherein the welding power source is configured to:
store a first relationship that correlates contact tip-to-work distance (CTWD) to one or more of a welding output current and a wire feed speed for a first wire type, a first wire size, and a first shielding gas type;
store a second relationship that correlates CTWD to one or more of the welding output current and the wire feed speed for a second wire type, second wire size, and a second shielding gas type;
select one of the first relationship or the second relationship based on a wire type and a wire size of a welding wire used for a welding process and a shielding gas type used for the welding process;
sample one or more of the welding output current and the wire feed speed in real time during the welding process; and
determine an actual CTWD in real time from the relationship selected, based on at least one of the welding output current or wire feed speed.

8. The system of claim 7, further comprising a welding gun configured to provide a tactile indication of the actual CTWD to a welder creating the weld by vibration of the welding gun.

9. The system of claim 8, wherein the welding power source is further configured to:
compare the actual CTWD to a target CTWD in real time; and
generate a deviation parameter in real time representative of a present deviation of the actual CTWD from the target CTWD based on the comparison.

10. The system of claim 9, wherein the system is configured to adjust a vibration frequency and a vibration intensity of the vibration of the welding gun based on the deviation parameter.

11. The system of claim 7, wherein the welding power source is further configured to determine the actual CTWD from a welding output voltage.

12. The welding system of claim 7, wherein the welding power source is further configured to utilize at least one of a look-up table or transfer function that relates the at least one of the welding output current or the wire feed speed to the actual CTWD, the at least one of the look-up table or transfer function is associated with the wire type and the wire size of the welding wire used for the welding process and the shielding gas type used for the welding process.

13. A welding power source, comprising a controller, wherein the controller is configured to determine an actual contact tip-to-work distance (CTWD) in real time based on a relationship of CTWD with at least one of a welding output current and a wire feed speed, wherein the relationship is selected from a plurality of relationships stored in the welding power source, based on a correspondence to inputs including a wire type and a wire size utilized to create a weld and a shielding gas type used during creation of the weld, and wherein the actual CTWD is determined from the relationship using at least one of the welding output current or the wire feed speed sampled during creation of the weld.

14. The welding power source of claim 13, wherein the controller is further configured to determine the actual CTWD from a welding output voltage.

15. The welding power source of claim 13, wherein the controller is further configured to:
compare the actual CTWD to a target CTWD in real time; and
generate a deviation parameter in real time representative of a present deviation of the actual CTWD from the target CTWD based on the comparison.

16. The welding power source of claim 13, wherein the controller is further configured to utilize at least one of a look-up table or a transfer function associated with the wire type, the wire size, and the shielding gas type, the at least one of the look-up table or the transfer function relates the at least one of the welding output current or the wire feed speed to the actual CTWD.

* * * * *